United States Patent
Eran et al.

(10) Patent No.: US 7,307,977 B1
(45) Date of Patent: Dec. 11, 2007

(54) INFORMATION TRANSFER AND INTERRUPT EVENT SCHEDULING SCHEME FOR A COMMUNICATIONS TRANSCEIVER INCORPORATING MULTIPLE PROCESSING ELEMENTS

(75) Inventors: Alon Eran, Moshav Beit Elazary (IL); Yaniv Avital, Mevaseret Zion (IL); Ehud Reshef, Qiryat Tivon (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 1301 days.

(21) Appl. No.: 10/262,691

(22) Filed: Oct. 1, 2002

(51) Int. Cl.
 *H04J 13/02* (2006.01)
(52) U.S. Cl. ............... 370/342; 370/347; 375/147
(58) Field of Classification Search ........... 370/342, 370/345, 347, 350; 375/147, 140, 141, 144
 See application file for complete search history.

(56) References Cited

U.S. PATENT DOCUMENTS

| | | | |
|---|---|---|---|
| 6,098,126 A | 8/2000 | Batson et al. | 710/58 |
| 6,115,775 A | 9/2000 | Ross et al. | 710/260 |
| 6,125,404 A | 9/2000 | Vaglica et al. | 709/400 |
| 6,230,255 B1 | 5/2001 | Asghar et al. | 712/32 |
| 6,237,058 B1 | 5/2001 | Nakagawa | 710/260 |
| 6,621,808 B1 * | 9/2003 | Sadri | 370/335 |
| 6,650,694 B1 * | 11/2003 | Brown et al. | 375/150 |
| 6,792,031 B1 * | 9/2004 | Sriram et al. | 375/147 |
| 6,859,434 B2 * | 2/2005 | Segal et al. | 370/230 |
| 2002/0080742 A1 * | 6/2002 | Proctor, Jr. | 370/335 |
| 2002/0094017 A1 * | 7/2002 | Wang | 375/144 |
| 2002/0188749 A1 | 12/2002 | Gaur | |
| 2003/0156626 A1 * | 8/2003 | Margulis et al. | 375/147 |

OTHER PUBLICATIONS

U.S. Appl. No. 10/262,804, filed Oct. 1, 2002, Segal et al.
A. Cataldo, Xyron offers fresh approach to solve processor latency, EE Times, Feb. 15, 2002.

* cited by examiner

*Primary Examiner*—Min Jung
(74) *Attorney, Agent, or Firm*—Zaretsky & Associates PC; Howard Zaretsky

(57) ABSTRACT

A real-time optimizing information transfer and interrupt event scheduling scheme for a communications transceiver incorporating multiple processing elements. The scheme is particularly applicable for use in UMTS based communications transceivers, i.e. W-CDMA transceivers adapted for User Equipment (UE). The interrupt scheduling scheme of the present invention is operative to perform the scheduling of interrupts used to configure a data transfer device to effect the timely transfer of data from a hardware based chip rate processor to a memory buffer for subsequent processing by software running on a DSP or other processor platform.

34 Claims, 8 Drawing Sheets

INFORMATION TRANSFER AND INTERRUPT EVENT SCHEDULING SCHEME FOR A COMMUNICATIONS TRANSCEIVER INCORPORATING MULTIPLE PROCESSING ELEMENTS

REFERENCE TO RELATED APPLICATIONS

This application is related to U.S. application Ser. No. 10/262,804, filed Oct. 1, 2002, entitled "Data Transfer Scheme In A Communications System Incorporating Multiple Processing Elements," now U.S. Pat. No. 6,859,434, similarly assigned and incorporated herein by reference in its entirety.

FIELD OF THE INVENTION

The present invention relates generally to the area of communications transceivers and more particularly relates to an interrupt event scheduling scheme for optimizing information transfer between modules in a communications transceiver incorporating multiple processing elements.

BACKGROUND OF THE INVENTION

Mobile radio communication systems are currently under development to provide global mobility with a wide range of services including telephony, paging, messaging, and broadband including Internet access. The Third Generation Partnership Project (3GPP) formed for technical development of the W-CDMA standard has five main UMTS standardization areas including the Radio Access Network, Core Network, Terminals, Services and System Aspects and GERAN.

A UMTS network consists of three interacting domains: (1) the Core Network (CN); (2) Universal Terrestrial Radio Access Network (UTRAN); and (3) User Equipment (UE). Wide band Code Division Multiple Access (W-CDMA) technology was selected for UTRA. UMTS W-CDMA is a Direct Sequence CDMA system where user data is multiplied by spreading codes for channelization, and scrambling codes for synchronization and scrambling.

UMTS has provisions for a fast power control mechanism employing closed loop power control. Open loop power control is also provided whereby the UE transmitter sets its output power to a specific value. Initial uplink and downlink transmission power levels are configured during set up of a dedicated channel via the open loop power control mechanism.

The UMTS fast power control mechanism employs two separate loops known as Transmit Power Control (TPC) loops: one for Uplink power and one for Downlink power, referred to as ULTPC and DLTPC, respectively. Both the ULTPC loop and DLTPC loop cycle at 1500 Hz meaning both loops are updated once per time slot. Alternately, both loops perform control processing during every timeslot. The update, however, may occur at a rate lower than once per time slot. The standard does not indicate a requirement for the processing delay, but only indicates the required performance (while hinting that a certain processing delay might be needed to achieve adequate performance).

The ULTPC loop gives the UE transmitter the ability to adjust its output power in accordance with one or more Transmit Power Control (TPC) commands received in the Downlink Dedicated Physical Channel (DL-DPCH) so as to keep the uplink signal level at a network designated level. The UE transmitter must be capable of changing the output power with a step size of 1, 2 and 3 dB, in the time slot immediately occurring after the TPC command is derived. The serving cell generates TPC commands and transmits the commands once per time slot. Upon reception of one or more TPC commands at the same time (i.e. from the cells in the active set), the UE derives a single TPC command for each time slot, combining multiple TPC commands if more than one is received at the same time.

Note that the target or desired SIR is an internal value in the UE which is derived from a target BLER value provided for every logical receive channel. The standard maintains that the target BLER be attained while the downlink power control loop is closed. Thus, the target SIR is a manifestation of the target BLER in the internal metrics of the UE.

The DLTPC loop functions to adjust the transmission quality, represented by the SIR, to a transmission quality target value. Based on data (e.g., pilot symbols) sent by the cell transmitter, the UE generates appropriate transmit power control (TPC) commands for transmission back to the network on the Uplink Dedicated Physical Control Channel (UL-DPCH). An 'up' power control command is sent back to the network when the estimated SIR is below the target value whereas a 'down' power control command is sent when the SIR is above the target specified by the Open Loop power control mechanism.

Thus, from the point of view of the UE transceiver, each TPC loop cycle requires a separate type of processing. In particular, for the DLTPC loop, downlink receive SIR estimation must be performed. For the ULTPC, TPC command decoding must be performed. From a scheduling perspective, however, both downlink and uplink transmit power control loops are constrained by the same limitation, namely the structure, format and timing separation of the DL-DPCH and UL-DPCCH time slot data fields. It is noted that SIR estimations do not necessarily need to be performed on the pilot fields. An advantage to performing it on the pilot field is coherent accumulation since the bits transmitted are known. Alternatively, however, the SIR estimation may be performed on the entire timeslot, though performance is lessened.

A timing diagram illustrating typical timing for prior art UE single receive path timing in CELL_DCH mode of reception is shown in FIG. 1. The receive downlink DPCH format, generally referenced 10, comprises within each time slot a first data field 12, TPC field 14, TFCI field 16, second data field 18 and a pilot field 20. The transmit uplink DPCCH format, generally referenced 22, comprises a pilot field 24, TFCI field 26 and TPC field 28 (and possibly additional fields).

In W-CDMA the downlink transmit stream is composed of radio frames, each 10 milliseconds long. Each frame is comprised of 15 timeslots of equal length. At a chip rate of 3.84 Mchips/s, each radio frame is 38400 chips long and each time slot is 2560 chips long. Each time slot is a time multiplexing of the DPDCH and DPCCH channels. The DPDCH is composed of two data field (i.e. Data1 and Data2) and the DPCCH is composed of a pilot field, a TPC field and a TFCI field. The lengths of the fields are as in accordance with the timeslot format designated at that point in time. Note that timeslot formats may change as fast as once every frame.

As indicated in FIG. 1, during each time slot, UE timing is constrained by several factors. The most severe timing constraint is the power control timing where two power control procedures, including one for the uplink power control loop and one for the downlink power control loop, are squeezed between the start point on the downlink receive stream and the end point on the uplink transmit stream. To complicate matters, these start and end points are dynamic and can change substantially over time where the range of interval lengths thus placing an even tighter constraint on real time performance.

Thus, there is a need for an efficient scheduling scheme that is capable of insuring the availability of data at the proper time and place such that the required time critical operations and tasks may be performed to meet the standard. Further, the system should provide the received data to the processor with minimal latency from the time of reception. It is also desirable for the scheduling scheme to be able to provide the received data to the processing point in a system comprising multiple receive data streams such as in W-CDMA transceivers whose typical reception scenarios include multipath propagation and the need to properly align multiple receive data streams.

In the case of multipath reception, the most delayed finger in the rake receiver architecture dictates the minimum timing difference between receive and transmit. As the time difference decreases, the time available for the required processing also decreases. The timing constraints worsen as the DL-UL timing offset becomes smaller and smaller. The nominal offset of 1024 chips but in accordance with the standard may get as low as a few hundred chips making the timing constraints even tighter.

SUMMARY OF THE INVENTION

The present invention is a real-time optimized information transfer and interrupt event scheduling scheme for communications transceivers incorporating multiple processing elements including both hardware and software modules. The scheme is applicable for use in communication transceivers and particularly UMTS communications transceivers such as Wideband Code Division Multiple Access (W-CDMA) transceivers adapted for User Equipment (UE). The interrupt scheduling scheme of the present invention is operative to perform the scheduling of interrupts used to configure a data transfer device or data transfer means such as a DMA controller to effect the timely transfer of data from hardware modules to a memory buffer for subsequent processing by software running on a DSP or other processor platform.

In a W-CDMA communications transceiver, a data transfer means, e.g., DMA controller, is configured twice during each time slot to transfer a predetermined amount of symbols output from a plurality of hardware fingers of a rake receiver to a memory buffer. Interrupt scheduling algorithms in a software module running on a DSP or other processor are operative to configure the data transfer means appropriately such that certain data received on the downlink dedicated physical channel is made available to the processor at the appropriate time for the completion of time critical tasks. During each time slot, the DL-DPCH fields are stored in the memory buffer in order for the processor to perform time critical operations on the contents of the buffer. The various fields such as the downlink pilot field and the downlink TPC fields are assigned different processing priorities.

In particular, an estimate of the Signal to Interference Ratio (SIR) is generated from the received pilot symbols and used to generate a TPC command to be transmitted over the uplink DPCCH. The received downlink TPC command is used to generate an amplifier gain command that is forwarded to the transmitter amplifiers in time to effect the transmission of the uplink pilot field of the next timeslot.

In order to meet these narrow time constraints, the interrupts are scheduled using two sets of configuration registers wherein the data transfer means switches or alternates from one set to the other after the occurrence of each interrupt event. During each time slot, two interrupts are triggered: one after the pilot data is transferred and the other after the TPC data is transferred. Both interrupts are set in accordance with the timing of the finger having the longest associated delay.

The invention is implemented partly in hardware and partly in software and functions to synchronize the functions of a chip rate processor adapted to implement the Chip Rate processing in a rake receiver having a plurality of fingers and a software-processing module the combination of which implements a UE W-CDMA communications transceiver.

The interrupt scheduling scheme of the present invention is adapted to insure the timely transfers of information from the chip rate processor to a memory buffer that is part of the software-processing module. The scheme also insures the real time computation of closed loop power control, transmit diversity support and other less time critical tasks that must be performed in the transceiver.

In particular, the interrupt scheduling scheme provides the following benefits: (1) low latency for high priority tasks due to fast and efficient configuration of the data transfer means configuration registers; (2) single interrupt source for all reception related interrupt events as opposed to several interrupt sources for all events which would not work due to coordination difficulties; (3) inherent tracking of timing drift since the interrupts are reconfigured in each timeslot possibly according to the timing of the finger having the longest delay which can vary from time slot to time slot; (4) full control over both the transmit and receiver time base; (5) the ability to meet the real time constraints for UMTS UE operation; and (6) the enablement of a hardware and software integrated solution for UMTS UE.

There is thus provided in accordance with the invention, a method of scheduling multiple interrupts during each time slot in a Wideband Code Division Multiple Access (W-CDMA) communications transceiver including data transfer means having a first configuration register set and a second configuration register set for transferring data between a hardware module implementing a plurality of fingers of a rake receiver and a memory buffer for subsequent processing by a software module, the method comprising the steps of transferring Transmit Power Control (TPC) field data output from the plurality of fingers to the memory buffer via the data transfer means in accordance with the first configuration register set and generating a first interrupt therefrom, configuring the second configuration register set such that a second interrupt is triggered upon transfer completion of downlink pilot field data from a finger having the longest delay, transferring pilot field data output from the plurality of fingers to the memory buffer via the data transfer means in accordance with the second configuration register set and generating a second interrupt therefrom and configuring the first configuration register set such that a first interrupt is triggered upon transfer completion of downlink TPC field data from a finger having the longest delay.

There is also provided in accordance with the invention, an apparatus for scheduling interrupts during each time slot in a Wideband Code Division Multiple Access (W-CDMA) communications transceiver for transferring data via data transfer means between a hardware module implementing a plurality of fingers of a rake receiver and a memory buffer comprising means for determining the finger having the longest delay associated therewith, means for configuring a first data transfer means configuration register set such that a second interrupt is triggered upon transfer of entire pilot field data from the finger having the longest delay to the memory buffer, the first data transfer means configuration register set configured during transfer of Transmit Power Control (TPC) field data from the plurality of fingers to the memory buffer and means for configuring a second data transfer means configuration register set such that a first interrupt is triggered upon transfer of entire TPC field data from the finger having the longest delay to the memory buffer, the second data transfer means configuration register set configured during transfer of pilot field data from the plurality of fingers to the memory buffer.

There is further provided in accordance with the invention, a Wideband Code Division Multiple Access (W-CDMA) communications transceiver comprising analog front end processor, a chip rate processor comprising a searcher unit and a plurality of fingers of a rake receiver, a memory buffer adapted to store symbols output of the plurality of fingers, data transfer means having a first configuration register set and a second configuration register set, the controller adapted to transfer data output from the fingers into the memory buffer, a processor and software means adapted to be executed on the processor for: determining in each time slot the finger having the longest delay, configuring the first configuration register set such that a second interrupt is triggered upon transfer of entire pilot field data from the finger having the longest delay to the memory buffer, the first configuration register set configured during transfer of Transmit Power Control (TPC) field data from the plurality of fingers to the memory buffer, configuring the second configuration register set such that a first interrupt is triggered upon transfer of entire TPC field data from the finger having the longest delay to the memory buffer, the second configuration register set configured during transfer of pilot field data from the plurality of fingers to the memory buffer and performing symbol rate processing on the contents of the memory buffer including the TPC and pilot fields.

There is also provided in accordance with the invention, a method of scheduling interrupts in a Universal Mobile Terrestrial Service (UMTS) User Equipment (UE) compatible communications transceiver having a hardware module implementing a plurality of fingers of a rake receiver, data transfer means and a memory buffer, the method comprising the steps of selecting during each time slot a finger having maximal delay as an interrupt timing reference, configuring the data transfer means during each time slot to generate a first interrupt upon transfer of a first predetermined number of downlink dedicated physical channel (DL-DPCH) pilot symbols determined in accordance with the interrupt timing reference and configuring the data transfer means during each time slot to generate a second interrupt upon transfer of a second predetermined number of downlink dedicated physical channel (DL-DPCH) Transmit Power Control (TPC) symbols determined in accordance with the interrupt timing reference.

There is further provided in accordance with the invention, a Universal Mobile Terrestrial Service (UMTS) User Equipment (UE) compatible communications transceiver comprising analog baseband processor, a chip rate processor comprising a rake receiver having a plurality of fingers, a memory adapted to store symbols output of the plurality of fingers, data transfer means operative to effect the transfer of symbols from the plurality of fingers to the memory, a processor coupled to the memory and software means adapted to be executed on the processor for: selecting during each time slot a finger having maximal delay as an interrupt timing reference, configuring the data transfer means during each time slot to generate a first interrupt upon transfer of a first predetermined number of downlink dedicated physical channel (DL-DPCH) pilot symbols determined in accordance with the interrupt timing reference, configuring the data transfer means during each time slot to generate a second interrupt upon transfer of a second predetermined number of downlink dedicated physical channel (DL-DPCH) Transmit Power Control (TPC) symbols determined in accordance with the interrupt timing reference, performing symbol rate processing on the contents of the memory.

BRIEF DESCRIPTION OF THE DRAWINGS

The invention is herein described, by way of example only, with reference to the accompanying drawings, wherein.

DETAILED DESCRIPTION OF THE INVENTION
Notation Used Throughout
The following notation is used throughout this document.

| Term | Definition |
| --- | --- |
| 3GPP | Third Generation Partnership Project |
| ASIC | Application Specific Integrated Circuit |
| BLER | Block Error Rate |
| BPF | Band Pass Filter |
| CDMA | Code Division Multiple Access |
| CN | Core Network |
| CPU | Central Processing Unit |
| DL-DPCH | Downlink Dedicated Physical Channel |
| DLTPC | Downlink Transmit Power Control |
| DMA | Direct Memory Access |
| DPCCH | Dedicated Physical Control Channel |
| DPCH | Dedicated Physical Channel |
| DPDCH | Dedicated Physical Data Channel |
| DPRAM | Dual Port Random Access Memory |
| DSP | Digital Signal Processor |
| FIFO | First In First Out |
| FPGA | Field Programmable Gate Array |
| IF | Intermediate Frequency |
| ISR | Interrupt Service Routine |

-continued

DETAILED DESCRIPTION OF THE INVENTION
Notation Used Throughout
The following notation is used throughout this document.

| Term | Definition |
|---|---|
| MRC | Maximal Ratio Combining |
| RAM | Random Access Memory |
| RF | Radio Frequency |
| ROM | Read Only Memory |
| SIR | Signal to Interference Ratio |
| TFCI | Transport Format Combination Indicator |
| TPC | Transmit Power Control |
| UE | User Equipment |
| UL-DPCH | Uplink Dedicated Physical Control Channel |
| ULTPC | Uplink Transmit Power Control |
| UMTS | Universal Mobile Terrestrial Service |
| UTRAN | Universal Terrestrial Radio Access Network |
| W-CDMA | Wideband Code Division Multiple Access |

DETAILED DESCRIPTION OF THE INVENTION

The present invention is an interrupt-scheduling scheme for optimizing information transfer between hardware and software modules. The scheme is applicable for use in communication transceivers and particularly UMTS communications transceivers, i.e. W-CDMA transceivers adapted for User Equipment (UE). The interrupt scheduling scheme of the present invention is operative to perform the scheduling of interrupts used to configure a data transfer means such as a DMA controller to effect the timely transfer of data from hardware modules to a memory buffer for subsequent processing by software running on a DSP or other processor platform.

Figure 1:
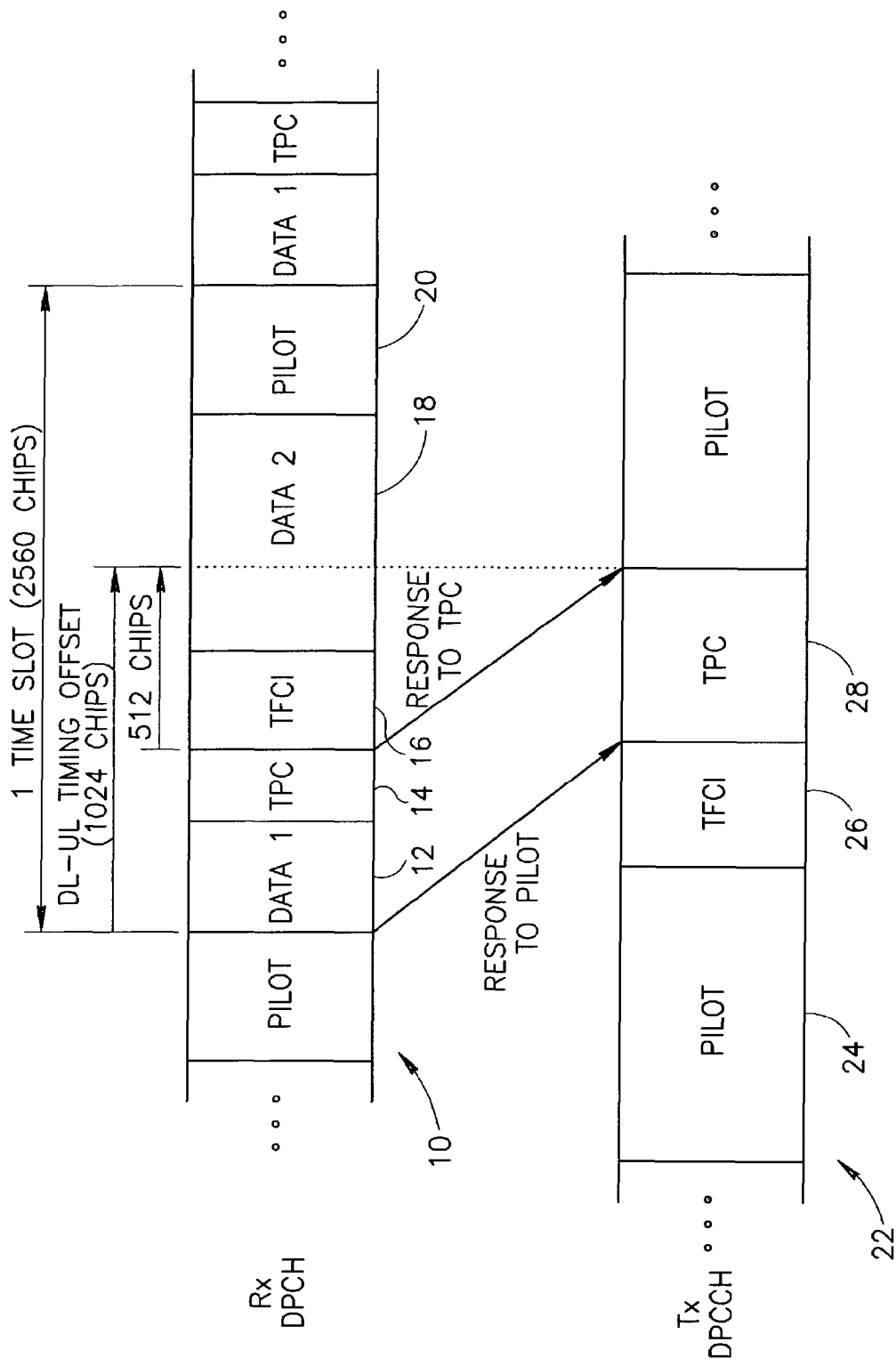
FIG. 1 is a timing diagram illustrating typical timing for prior art UE single receive path timing in CELL_DCH mode of reception.
Figure 2:
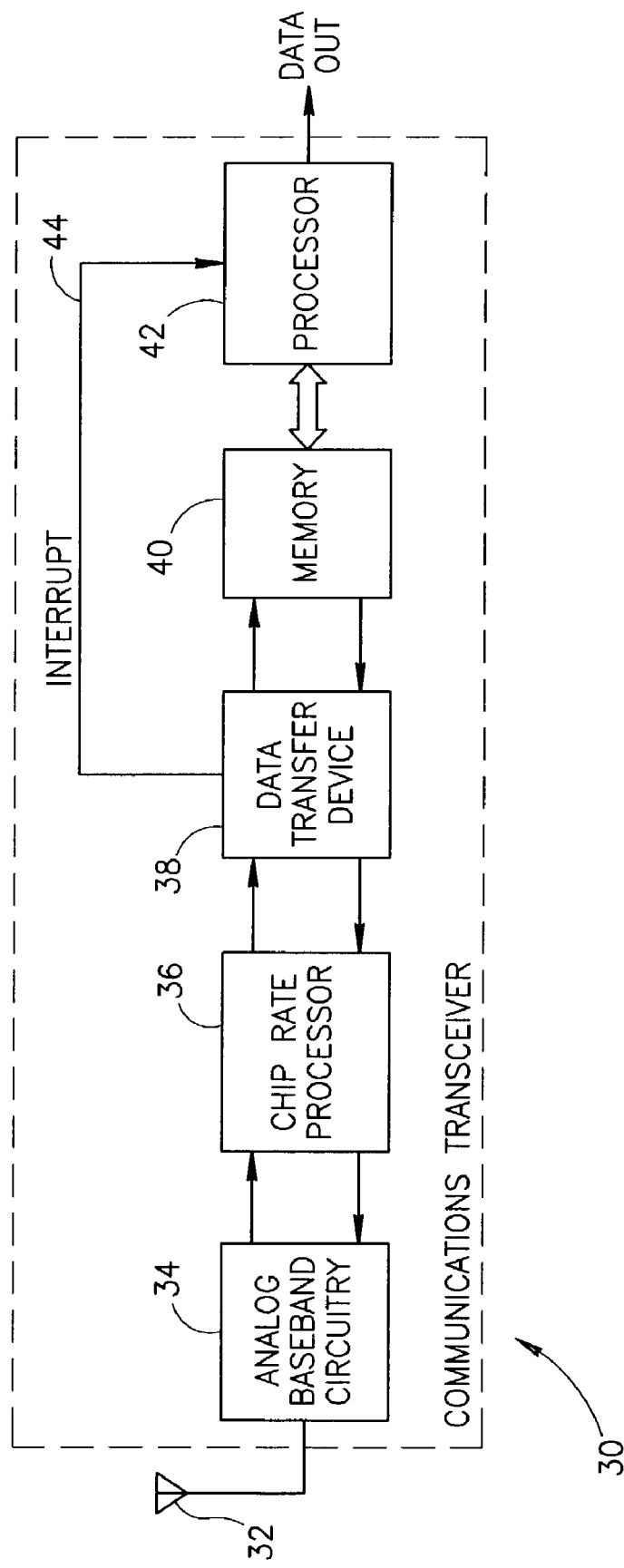
FIG. 2 is a block diagram illustrating an example embodiment of a UE W-CDMA communications system incorporating a chip rate processor and digital signal processor.

A block diagram illustrating an example embodiment of a UE W-CDMA communications system incorporating a chip rate processor and digital signal processor is shown in FIG. 2. The communications transceiver, generally referenced 30, represents a generalized block diagram on a UMTS based UE W-CDMA transceiver. The transceiver is electrically coupled to an RF antenna element 32. The received RF signal is processed by the analog baseband circuitry 34 which comprises, among other components, an RF front-end circuit, filters and A/D converters. In operation, the antenna receives a spread spectrum RF signal transmitted by one or more W-CDMA base stations. The RF front-end circuit receives the RF signal from the antenna and processes it. Several functions are performed by the RF front-end circuit depending on the particular implementation. For example, typical functions include a first downconversion from RF to IF, band pass filtering (BPF) to reject out-of-band interference and noise, a second downconversion from IF to baseband including splitting the signal into in-phase and quadrature phase (i.e. I and Q) components and matched filtering to match the pulse shape of the transmitted signal. It is noted that subsequent processing is adapted to handle the I and Q (complex) output of the RF front-end circuit. The received samples are then digitized and output to the chip rate processor 36.

One alternative to the super heterodyne downconversion scheme described above is a direct conversion scheme wherein the use of an IF oscillator is avoided and the RF from the antenna is mixed directly down to DC. Either scheme may be used with the direct conversion more typically of modern W-CDMA RF front-end designs. In addition, other RF schemes may be used without departing from the scope of the present invention.

The hardware accelerator (functioning as a chip rate processor) is adapted to receive the samples from the analog baseband circuit and perform chip-rate processing on those samples. One of the functions of the chip rate processor is to implement the rake receiver fingers for handling received multipath signal components. The digitized samples first pass through a matched filter which may or may not be implemented in the chip rate processor. The output of the matched filter is then input to the rake receiver fingers which function to de-spread the received signal. Fingers are allocated to different multipath components and the resultant plurality of output signals from the fingers are stored in a memory buffer 40 for subsequent software processing on a processor 42. The software processing is operative to combine the outputs from the plurality of fingers into a single stream, referred to as Maximal Ratio Combining (MRC). The combined output signal is then demodulated and decoded to generate the user data output signal. Thus, the rake receiver is implemented in a combination of hardware and software.

Note that throughout this document, the term hardware accelerator is equivalent to the term chip rate processor and is defined as any processor or processing platform, programmable or not, capable of performing chip rate processing using hardware, software or a combination of hardware and software.

The chip rate processor comprises not only the fingers of the rake receiver but also comprises code generators, search units, timers and other functional circuits. This document focuses on the finger units of the chip rate processor only because they dictate the interrupt timing used in the scheduling scheme of the present invention. It is appreciated by one skilled in the art that the chip rate processor comprises numerous additional circuits for performing several tasks crucial for the implementation of a UMTS compatible W-CDMA communications transceiver.

It is important to note that the flow of data from the chip rate processor is continuous. Although the data may be transferred in blocks, once a block size is selected, the data is transferred continuously block by block. The output data is transferred to the memory buffers under control of the data transfer device 38. Once the data transfer device transfers a block of data having a preset size from the chip rate processor to the processor memory, the data transfer device generates an interrupt request (IRQ) signal 44 to the processor 42. In response to the interrupt, the processor invokes the interrupt service routine.

Figure 3:
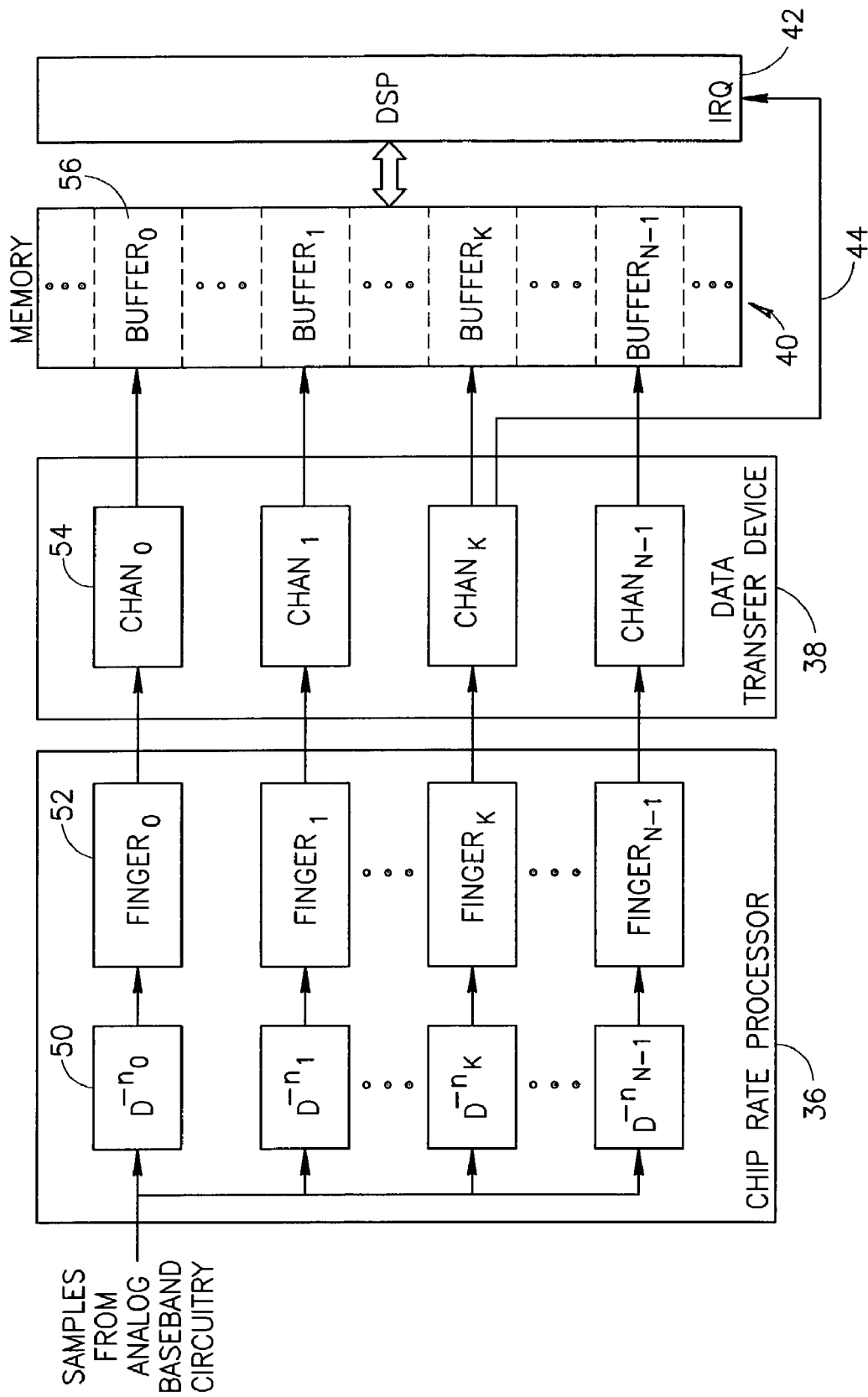
FIG. 3 is a block diagram illustrating the chip rate processor, data transfer means, example memory buffer organization and DSP block of FIG. 2 in more detail.

To better illustrate the interrupt scheduling scheme of the present invention a block diagram illustrating the chip rate processor, data transfer device and DSP block of FIG. 2 in more detail is shown in FIG. 3. A portion of the rake receiver is shown in the chip rate processor block. In particular, the chip rate processor implements the plurality of fingers 52, labeled $Finger_0$ through $Finger_{N-1}$, wherein each finger is assigned a different delay D 50, and possibly different channelization and scrambling codes. Thus, $Finger_K$ is assigned delay $D^{-n_K}$ which corresponds to a particular multipath component.

In accordance with the invention, the terms data transfer means, data transfer circuit and data transfer device are all used interchangeably and any suitable implementation thereof may be used with the present invention. Examples of suitable data transfer means include but are not limited to DMA controllers, hardware FIFO circuits, shared memories and dual port RAM devices. Note that typical dual port RAM devices cannot generate an interrupt, therefore the interrupt request must be generated by the chip rate processor. For illustration purposes only, the invention is described in the context of a DMA controller. It is appreciated that other data transfer means may be used instead without departing from the scope of the invention.

The data transfer device comprises a plurality of channels 54, $CHAN_0$ through $CHAN_{N-1}$, wherein each channel is adapted to transfer data output from a separate finger to a memory buffer. It is an important requirement for operation of the invention that each channel comprise at least two separate configuration register sets. Each configuration register set functions to completely describe the operation of a channel. In addition, these two configuration register sets must be able to be automatically swapped (or rotated in the case more than two configuration register sets are available) upon the generation of an interrupt request. Note that many commercially available DMA controllers provide these features, however, some lower end reduced cost DMA controller designs might not.

It will be appreciated by one skilled in the art that other data transfer and memory organizations and configurations may be implemented without departing from the scope of the present invention. For example, in an alternative embodiment, a data transfer device having a single channel may be used to write data into the memory buffer. Depending on the specific implementation and application, one approach may be more efficient than another.

The memory 40 is organized into a plurality of buffers 56, indicated as $BUFFER_0$ through $BUFFER_{N-1}$. Each data transfer channel is adapted to transfer data from one of the fingers to a separate memory buffer. Each buffer is associated with a single data transfer channel and corresponding finger. The buffers are implemented as cyclic buffers and are preferably large enough to store at least a full time slot of symbols at the operating spreading factor. Depending on the implementation, a single timeslot sized buffer may not be sufficient to hold the required backlog of symbols. In such a case, additional memory is required as extra space in addition to an entire timeslot in order to prevent an overflow condition.

The processor 42 may be implemented as a microcontroller, microprocessor, microcomputer, ASIC core, FPGA core, central processing unit (CPU) or digital signal processor (DSP), for example. The system further comprises any other memory and support circuits required for operation of the system, including for example, read only memory (ROM), static and/or dynamic main memory (e.g., RAM), clock circuits, interface circuits, peripheral devices, etc.

In operation, only one data transfer channel is configured to generate an interrupt. The finger having the longest delay associated with it is selected as the interrupt reference finger. The data transfer channel associated with the interrupt reference is configured to generate an interrupt request after a predetermined number of symbols have been transferred from the chip rate processor to the memory buffers. As an example, consider Finger-k to have the longest delay associated therewith. It is therefore selected as the interrupt reference and in response, data transfer channel-k is configured to generate an interrupt request upon the transfer of a predetermined number of symbols from Finger-k to memory buffer-k.

The finger selection for configuring the generation of the data transfer interrupt is dynamic over time and can vary from time slot to time slot due to the dynamic assignment of delays to the fingers in the rake receiver. At each configuration change the finger with the longest delay is determined and used to configure its associated data transfer channel to generate the interrupt request from then onward. Once the interrupt is generated, the processor accesses the contents of the buffers and performs the appropriate symbol and bit rate processing.

Figure 4:
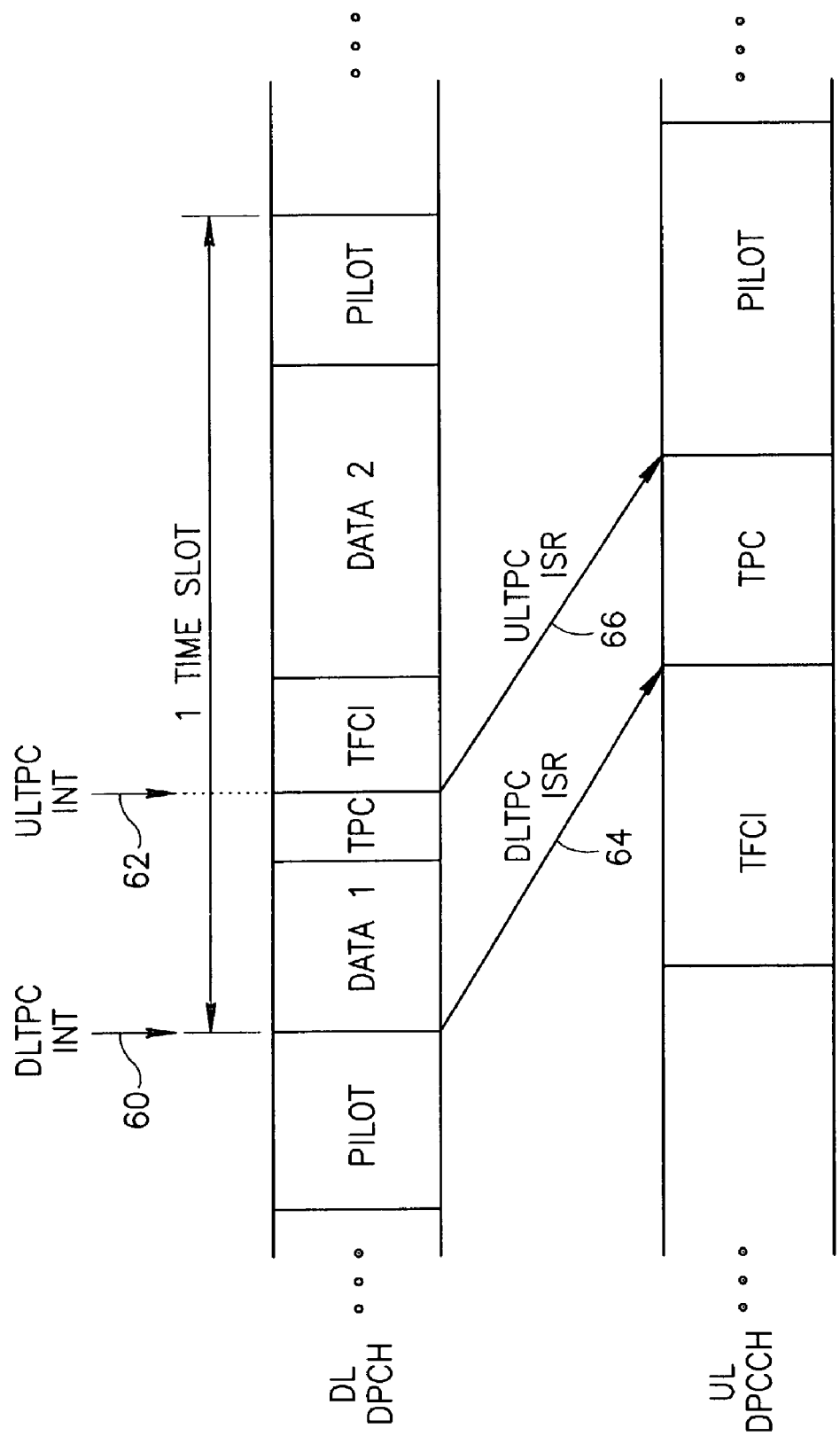
FIG. 4 is a timing diagram illustrating relationship for a single finger between receive and transmit dedicated physical channels and related interrupt service routine processing scheduled in accordance with the present invention.

A timing diagram illustrating relationship for a single finger between receive and transmit dedicated physical channels and related interrupt service routine processing scheduled in accordance with the present invention is shown in FIG. 4. To aid in understanding the principles of the present invention, the scenario for a single propagation path is described first followed by the case for multiple propagation paths.

The top portion represents the timing for the received Downlink Dedicated Physical Channel (DL-DPCH). The lower portion represents the timing for the transmitted Uplink Dedicated Physical Control Channel (UL-DPCCH). The component fields of both streams were described supra in the Background Section of this document.

As described previously, there are two time critical tasks that must be performed each time slot. The first task is the processing of the pilot field received in the DL-DPCH and generation of the TPC for transmission to the base station via the UL-DPCCH. The second task is the decoding of the TPC field received in the DL-DPCH and configuring the transmitter amplifier gain in accordance with the received TPC command.

In order to perform the required processing with the available time, two interrupt events are triggered each DPCH receive time slot. Both interrupts are of a single source for all reception related tasks, i.e. the data transfer device, and are triggered by the arrival of data blocks from the chip rate processor that implements the chip rate processing of the W-CDMA communications transceiver. The first interrupt event follows the reception of the pilot field and is indicated as DLTPC INT 60. The second interrupt follows the reception of the TPC field and is indicated as ULTPC INT 62.

The interrupt service routine (ISR) processing for the DLTPC interrupt is indicated by the arrow labeled DLTPC ISR (referenced 64). During the DLTPC ISR, the received pilot data is used to estimate the SIR and to generate a TPC command to adjust downlink power control. The interrupt service routine processing for the ULTPC interrupt is indicated by the arrow labeled ULTPC ISR (referenced 66). During the ULTPC ISR, the TPC command received in the downlink is decoded and the UE transmitter amplifier gain adjusted accordingly before the transmission of the pilot field in the uplink. Both service routines are described in more detail infra.

Since both interrupts are data driven, the corresponding interrupt service routines must process the newly acquired data and reconfigure the data transfer device for one after the next block of data in time before the next block of data arrives. The actual timing from one interrupt to the next, however, is not constant but can vary from interrupt to interrupt.

Figure 5:
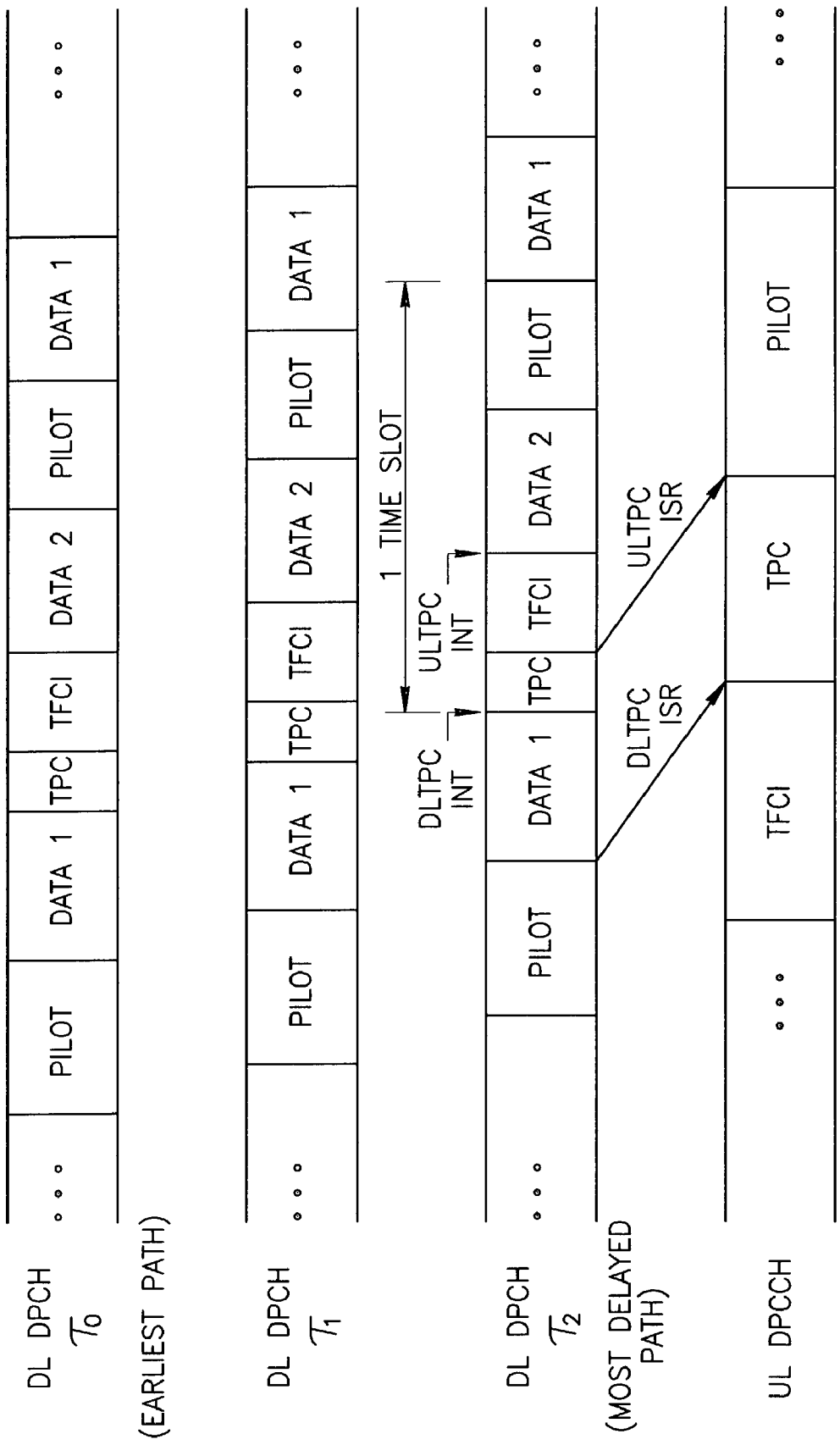
FIG. 5 is a timing diagram illustrating relationship for multiple fingers between receive and transmit dedicated physical channels and related interrupt service routine processing scheduled in accordance with the present invention.

A timing diagram illustrating relationship for multiple fingers between receive and transmit dedicated physical channels and related interrupt service routine processing scheduled in accordance with the present invention is shown in FIG. 5. In actuality, however, the rake receiver in the UE W-CDMA transceiver comprises not one but a plurality of fingers. The fingers are assigned delays, channelization codes and scrambling codes in accordance with the estimated multipath components in the received signal. Thus, one of the fingers is assigned an earliest delay corresponding to the earliest path and one of the fingers is assigned the most delay corresponding to the most delayed path. This is reflected in the example timing diagram shown in FIG. 5 wherein the top three streams represent the received DLD-PCH streams for three fingers, each assigned a different delay. The top stream represents the earliest path with delay $\tau_0$, the second stream represents the path with delay $\tau_1$ and the third stream represents the most delayed path with delay $\tau_2$.

Note that due to the dynamic nature of the finger timing, the delay of each finger and the total number of fingers can change from one time slot to the next. For example, it may be that the finger with delay $\tau_2$ may not be needed the next time slot and is removed. In addition, the timing of a finger can change from one time slot to the next, e.g., finger with delay $\tau_1$ has the longest delay in the next time slot. In each time slot, however, the timing is set according to the finger with the longest delay.

In accordance with the invention, during each time slot, both DLTPC and ULTPC data transfer interrupts are set with reference to the most delayed finger. Thus, the data transfer device (1) is configured such that the DLTPC interrupt occurs once the transfer of pilot data from the finger having the most delay to the memory is complete and (2) configures the UPTPC interrupt to occur once the transfer of TPC data from the finger having the most delay to the memory is complete.

The data transfer interrupts are set in accordance with the buffer length desired. Note that the difference between the earliest and most delayed path is on the order of 80 chips within the same cell. From cell to cell, the maximum time delay difference between the earliest path cell and the longest delay path cell may be 228 chips. Thus, if the delay for a specific finger is known, the field boundary timing is known and the cyclic buffer pointers can be set to read/write the same location in each of the buffers. Since the delay of the finger is known from the path searcher or other source, the finger can be configured according to this reference delay. The data transfer device can be set to start transferring data of the same field in the same part of the buffer. The different buffers will be filled, however, at different times.

An alternative to the use of cyclic buffers is to use set of non-cyclical buffers that the operating system, software driver, etc. knows how to access so as to store and retrieve the necessary symbols.

It is important to note that the interrupt intervals between the DLTPC interrupt and the ULTPC interrupt vary with time due to the dynamic nature of the delay associated with each of the hardware rake receiver fingers, but it is preferable to limit the changes to only one of the intervals, namely the shorter one since if the changes were limited to the longer interval there would be a bigger span of ambiguity to solve for. In addition, with the change in finger delays, the point in time when the next data block is completely received also varies over time, creating drift or jitter of the system clock. In accordance with the invention, the timing of the data transfer interrupts is set according to the most delayed propagation path (i.e. finger) being received at that moment in time. The system is thus able to tolerate drift and jitter of the system clock, assuming any drift or jitter is kept within the system clock requirements. Another benefit of the interrupt scheduling scheme is that the timing of the interrupt events function to synchronize Layer 1 control with the operation of the upper layers. This provides synchronization between the operation of the chip rate processor and the upper layers implemented in software.

The drift in the time base of the interrupt events during soft-handover, is tracked by the use of a time base reference hardware finger. This reference finger is the finger with the highest time lag compared to the other fingers in the hardware finger bank. From the point of view of the output of the chip rate processor, the last symbol of the correlation output of a given data block for this reference finger at a given point in time is the last to arrive at the transaction point (i.e. the interface of the data transfer channel).

Figure 6:
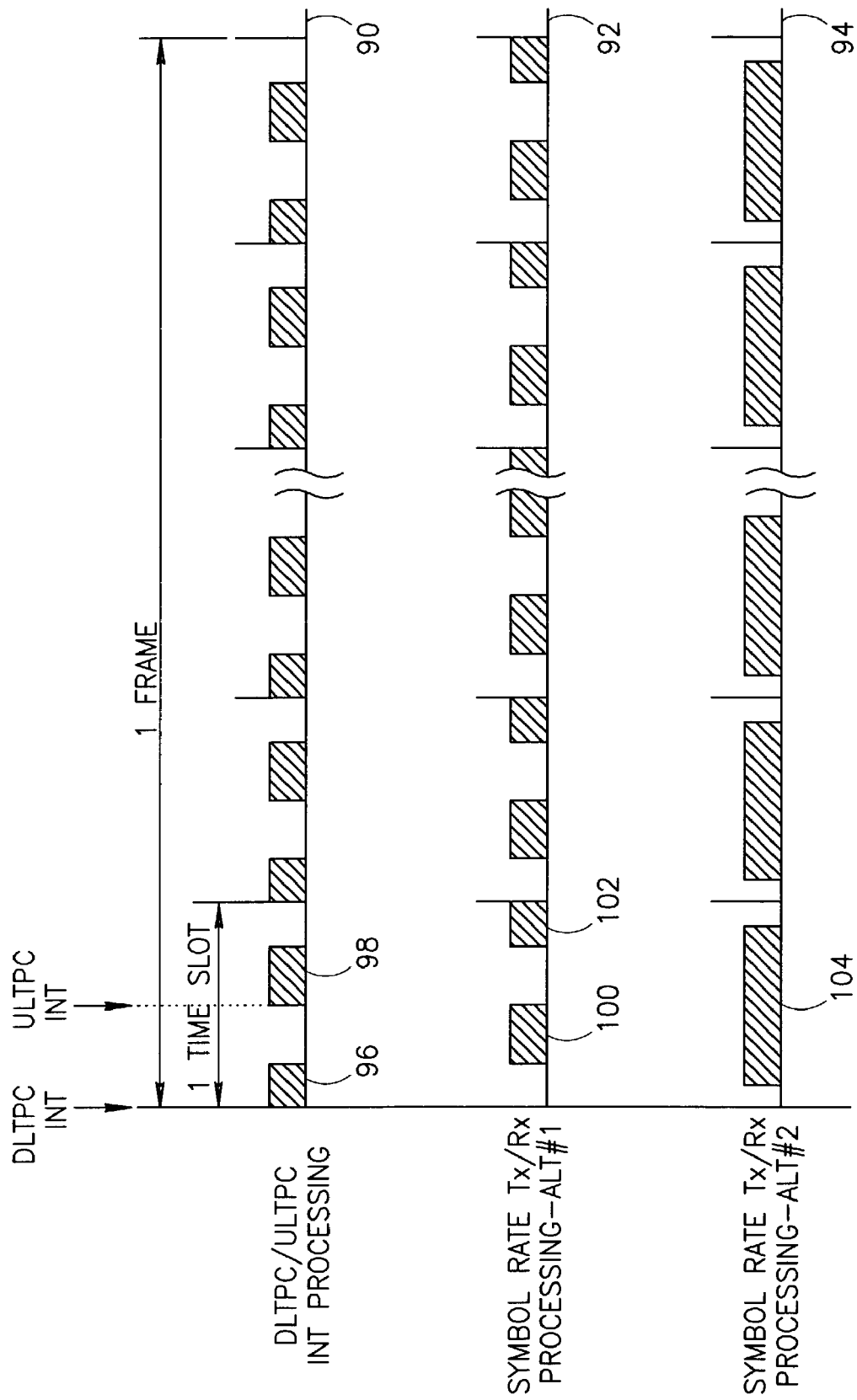
FIG. 6 is a timing diagram illustrating the system timing schedule including interrupt routine processing and transmitter control timing.

A timing diagram illustrating the system timing schedule including interrupt routine processing and transmitter control timing is shown in FIG. 6. Closed loop transmitter control is performed within these two interrupt service routines, thus intermingling the timing issues for transmit and receive. Once the control bits for transmit power control are generated during the ULTPC ISR they must be supplied to the transmitter in sufficient time to have the desired effect during transmission of the subsequent pilot field.

Timing trace 90 represents the processor time spent serving the DLTPC and ULTPC interrupt service routines 96, 98, respectively, during each time slot. Note that time slot boundaries shown represent those of the most delayed path. The middle timing trace 92 represents the symbol rate and bit rate transmit and receive processing performed. Each time slot includes two processing periods 100, 102 when the interrupts are not being serviced. As a second alternative, the interrupt and symbol rate processing may be divided into background and foreground tasks, e.g., using a multitasking operating system. In this second alternative, the DLTPC and ULTPC interrupt processing occurs in the foreground while the symbol and bit rate processing occur in the background independent of the interrupt occurrences. In a third alternative, the symbol rate processing is performed in the foreground immediately after the ULTPC interrupt service routine.

Note that interrupt scheduling scheme of the present invention permits the Layer 1 control to time events whereby the timing is derived from the occurrence of the interrupts. For example, frame counting can be accomplished by counting every 30 interrupts, since there are 15 time slots in a frame and two interrupts per time slot.

Figure 7:
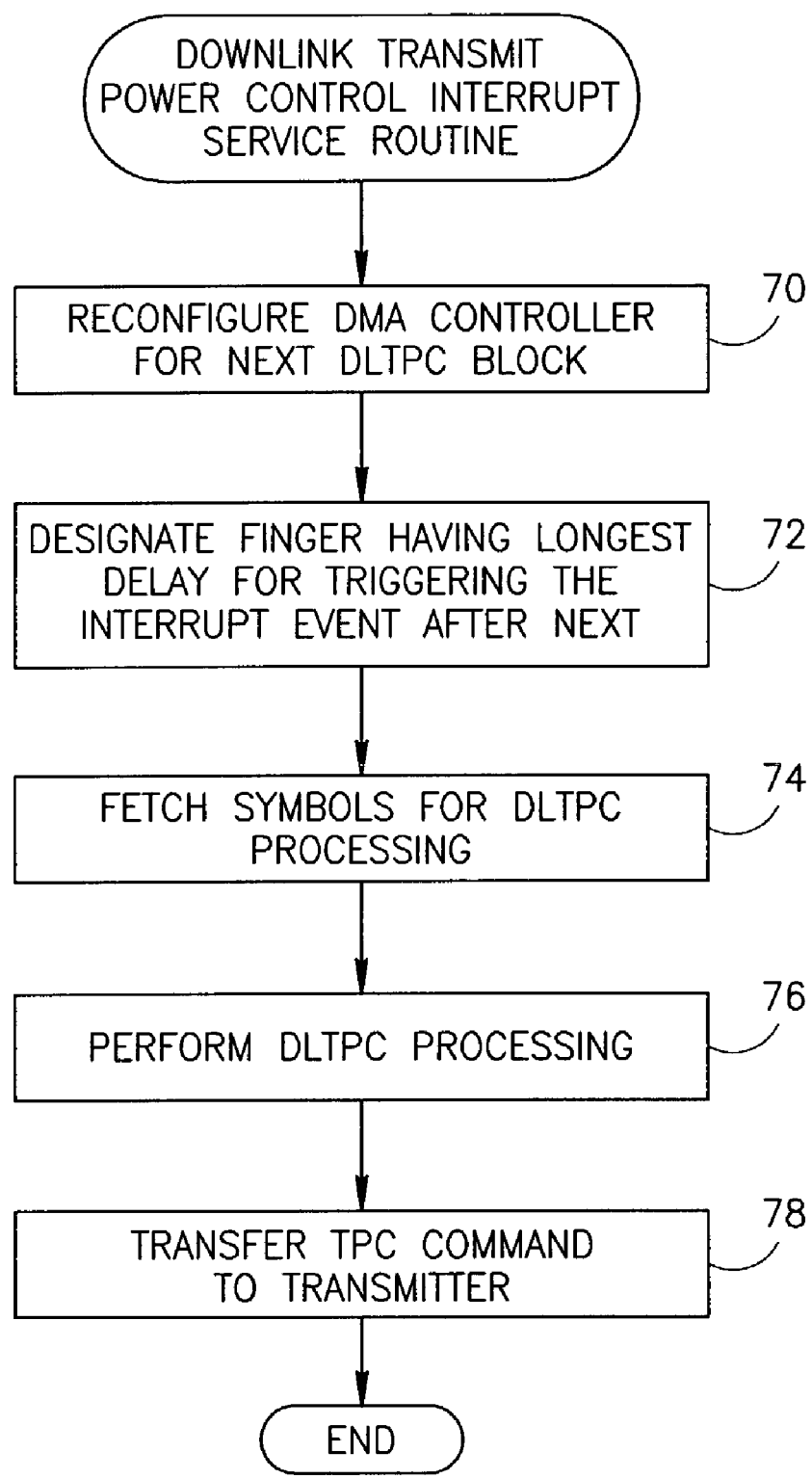
FIG. 7 is a flow diagram illustrating the downlink transmit power control interrupt service routine method of the present invention.

A flow diagram illustrating the downlink transmit power control interrupt service routine method of the present invention is shown in FIG. 7. The DLTPC interrupt service routine is executed upon the occurrence of a DLTPC interrupt. The data transfer device is reconfigured for the next DLTPC block (step 70). The finger having the longest delay is designated for triggering the interrupt event after the next interrupt (i.e. the second next interrupt) (step 72). The pilot symbols stored in the memory buffer are fetched for DLTPC processing (step 74). DLTPC processing is then performed, which includes generating the TPC command to be transmitted to the base station (step 76). The SIR estimate generated from the pilot received in the DLDPCH is used to generate the uplink TPC command. Once the TPC command is generated, it is transferred to the transmitter for transmission in the uplink DPCCH (step 78).

Figure 8:
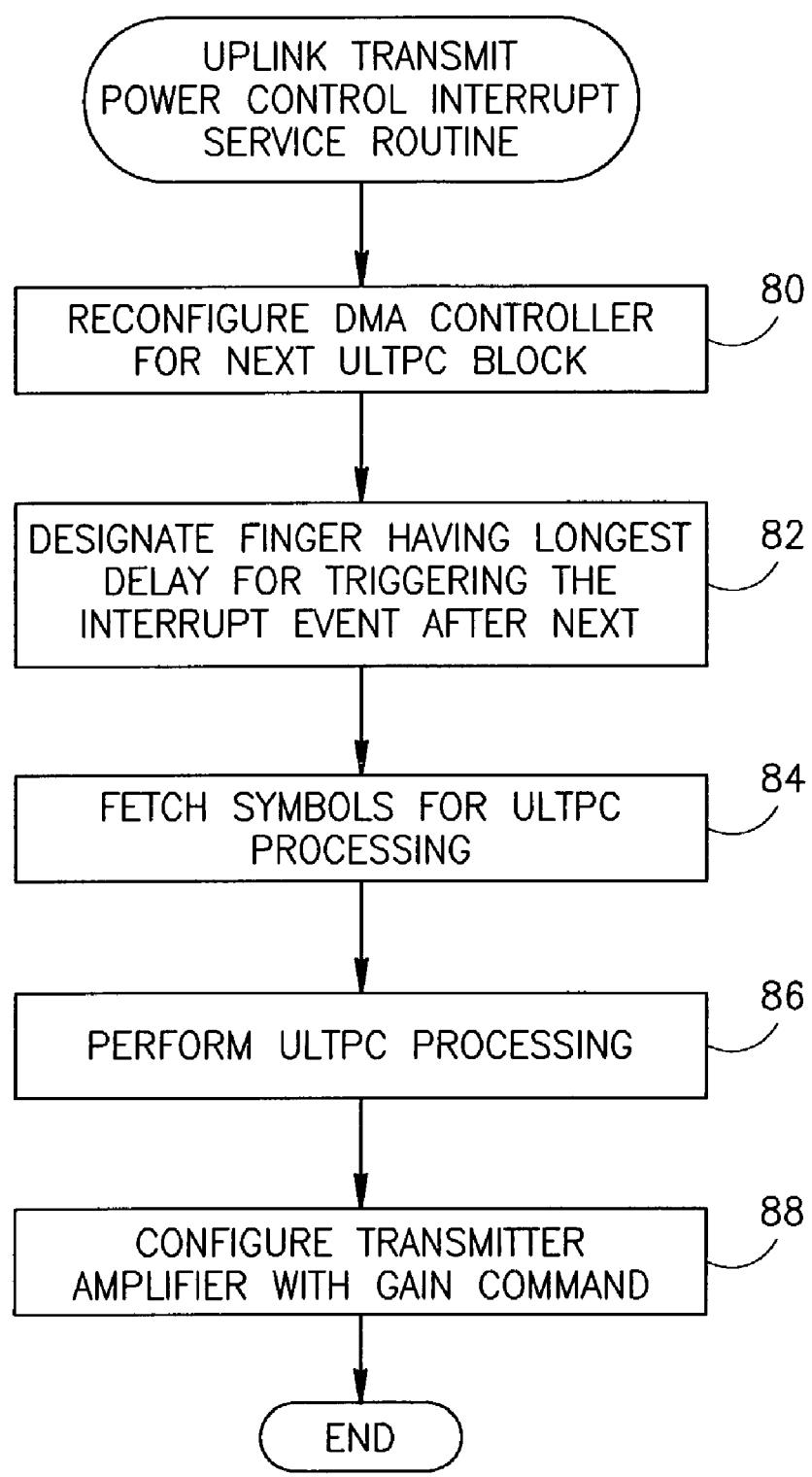
FIG. 8 is a flow diagram illustrating the uplink transmit power control interrupt service routine method of the present invention.

A flow diagram illustrating the uplink transmit power control interrupt service routine method of the present invention is shown in FIG. 8. The ULTPC interrupt service routine is executed upon the occurrence of a ULTPC interrupt. The data transfer device is reconfigured for the next ULTPC interrupt (step 80). The finger having the longest delay is designated for triggering the interrupt event after the next interrupt (i.e. the second next interrupt) (step 82). The TPC symbols stored in the memory buffer are fetched for ULTPC processing (step 84). ULTPC processing is then performed, which includes generating a gain command to be applied to the UE transmitter amplifier (step 86). The gain command must be applied to the transmitter amplifier in sufficient time before the transmission of the uplink DPCCH pilot. Once the amplifier TPC command is decoded and a gain command generated, the transmitter amplifier gain is configured with the gain command (step 88). Note that the configuration of the leading finger may be performed in only one of the interrupts and not in every time slot, i.e. once per N time slots, since the channel profile is a relatively slowly changing process In accordance with the standard, the transmitter amplifier gain may be changed only during a finite window of time spread before and after the beginning of the pilot field. The amplifier is not permitted to place any modulations effects in the transmitted signal. Thus, changes to the amplifier gain must be effected very slowly to meet the stabilization requirements.

Note that both DLTPC and ULTPC interrupt service routines are intended to be implemented in software adapted to be executed on the DSP or other suitable processor 42 (FIG. 2). Alternatively, a computer may be programmed to execute software adapted to perform the interrupt service routines of FIGS. 7 and 8. It is important to note that the interrupt scheduling scheme of the present invention is not limited to the example applications presented above but may be incorporated within a communications device such as a PDA, mobile user equipment (UE) (i.e. handsets), base stations, cordless telephone, cable modem, broadband modem, laptop, PC, network transmission or switching equipment, network device or any other wired or wireless communications device.

In alternative embodiments, the interrupt scheduling scheme of the present invention may be applicable to implementations in integrated circuits, field programmable gate arrays (FPGAs), chip sets or application specific integrated circuits (ASICs), DSP circuits, wired or wireless implementations and other communication system products.

It is important to note that the use of multiple data transfer channels to transfer data from a single finger is not recommended and is not practical due to high hardware costs. Thus, a single interrupt source for all reception related tasks wherein both DL and UL interrupts are handle by the same data transfer channel is preferred. As soon as the last symbol is transferred from the finger to the memory, the interrupt is triggered. Because the timing is variable, however, the size of the data blocks can change creating offsets due to the dynamic timing of the fingers.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of scheduling multiple interrupts during each time slot in a Wideband Code Division Multiple Access (W-CDMA) communications transceiver including data transfer means having a first configuration register set and a second configuration register set for transferring data between a hardware module implementing a plurality of fingers of a rake receiver and a memory buffer for subsequent processing by a software module, said method comprising the steps of:

transferring Transmit Power Control (TPC) field data output from said plurality of fingers to said memory buffer via said data transfer means in accordance with said first configuration register set and generating a first interrupt therefrom;

configuring said second configuration register set such that a second interrupt is triggered upon transfer completion of downlink pilot field data from a finger having the longest delay;

transferring pilot field data output from said plurality of fingers to said memory buffer via said data transfer means in accordance with said second configuration register set and generating a second interrupt therefrom; and configuring said first configuration register set such that a first interrupt is triggered upon transfer completion of downlink TPC field data from a finger having the longest delay.

2. The method according to claim 1, further comprising the step of processing said pilot field data stored in said memory buffer upon the occurrence of said second interrupt.

3. The method according to claim 1, further comprising the step of processing said TPC field data stored in said memory buffer upon the occurrence of said first interrupt.

4. The method according to claim 1, further comprising the step of processing the remaining fields in said memory buffer after processing of said TPC and pilot field data is complete.

5. The method according to claim 1, further comprising the step of performing said steps of transferring TPC field data, generating said first interrupt, configuring said second configuration register set, transferring pilot field data, generating said second interrupt, and configuring said first configuration register set once each time slot.

6. The method according to claim 1, wherein said step of transferring TPC field data comprises transferring TPC field data via separate channels, one channel per finger.

7. The method according to claim 1, wherein said step of transferring pilot field data comprises transferring pilot field data via separate channels, one channel per finger.

8. The method according to claim 1, further comprising the step of determining every time slot the finger having the longest delay.

9. The method according to claim 1, wherein said data transfer means comprises a Direct Memory Access (DMA) controller.

10. The method according to claim 1, wherein said data transfer means comprises a hardware based First In First Out (FIFO) buffer.

11. The method according to claim 1, wherein said data transfer means comprises a Dual Port Random Access Memory (DPRAM).

12. An apparatus for scheduling interrupts during each time slot in a Wideband Code Division Multiple Access (W-CDMA) communications transceiver for transferring data via data transfer means between a hardware module implementing a plurality of fingers of a rake receiver and a memory buffer, comprising:

means for determining the finger having the longest delay associated therewith;

means for configuring a first data transfer means configuration register set such that a second interrupt is triggered upon transfer of entire pilot field data from the finger having the longest delay to said memory buffer, said first data transfer means configuration register set configured during transfer of Transmit Power Control (TPC) field data from said plurality of fingers to said memory buffer; and means for configuring a second data transfer means configuration register set such that a first interrupt is triggered upon transfer of entire TPC field data from the finger having the longest delay to said memory buffer, said second data transfer means configuration register set configured during transfer of pilot field data from said plurality of fingers to said memory buffer.

13. The apparatus according to claim 12, wherein said data transfer means comprises a Direct Memory Access (DMA) controller.

14. The apparatus according to claim 12, wherein said data transfer means comprises a hardware based First In First Out (FIFO) buffer.

15. The apparatus according to claim 12, wherein said data transfer means comprises a Dual Port Random Access Memory (DPRAM).

16. The apparatus according to claim 12, further comprising means for processing the contents of said memory buffer including said TPC and pilot fields.

17. A Wideband Code Division Multiple Access (W-CDMA) communications transceiver, comprising:
analog front end processor;
a chip rate processor comprising a searcher unit and a plurality of fingers of a rake receiver;
a memory buffer adapted to store symbols output of said plurality of fingers;
data transfer means having a first configuration register set and a second configuration register set, said controller adapted to transfer data output from said fingers into said memory buffer;
a processor; and
software means adapted to be executed on said processor for:
determining in each time slot the finger having the longest delay;
configuring said first configuration register set such that a second interrupt is triggered upon transfer of entire pilot field data from the finger having the longest delay to said memory buffer, said first configuration register set configured during transfer of Transmit Power Control (TPC) field data from said plurality of fingers to said memory buffer;
configuring said second configuration register set such that a first interrupt is triggered upon transfer of entire TPC field data from the finger having the longest delay to said memory buffer, said second configuration register set configured during transfer of pilot field data from said plurality of fingers to said memory buffer; and
performing symbol rate processing on the contents of said memory buffer including said TPC and pilot fields.

18. The transceiver according to claim 17, wherein said data transfer means comprises a plurality of channels, one channel associated with each finger.

19. The transceiver according to claim 17, wherein configuring said first interrupt and said second interrupt in accordance with the timing of the finger with the longest delay is operative to synchronize said hardware module and said software means.

20. The transceiver according to claim 17, wherein configuring said data transfer means to trigger said first interrupt and said second interrupt in accordance with timing of finger with longest delay is operative to track any timing drift in a system clock of said transceiver.

21. The transceiver according to claim 17, wherein software means is adapted to process the remainder of said contents of said memory buffer once processing of said TPC and pilot fields is complete.

22. The transceiver according to claim 17, wherein said data transfer means comprises a Direct Memory Access (DMA) controller.

23. The transceiver according to claim 17, wherein said data transfer means comprises a hardware based First In First Out (FIFO) buffer.

24. The transceiver according to claim 17, wherein said data transfer means comprises a Dual Port Random Access Memory (DPRAM).

25. A method of scheduling interrupts in a Universal Mobile Terrestrial Service (UMTS) User Equipment (UE) compatible communications transceiver having a hardware module implementing a plurality of fingers of a rake receiver, data transfer means and a memory buffer, said method comprising the steps of:
selecting during each time slot a finger having maximal delay as an interrupt timing reference;
configuring said data transfer means during each time slot to generate a first interrupt upon transfer of a first predetermined number of downlink dedicated physical channel (DL-DPCH) pilot symbols determined in accordance with said interrupt timing reference; and
configuring said data transfer means during each time slot to generate a second interrupt upon transfer of a second predetermined number of downlink dedicated physical channel (DL-DPCH) Transmit Power Control (TPC) symbols determined in accordance with said interrupt timing reference.

26. The method according to claim 25, wherein said data transfer means comprises a Direct Memory Access (DMA) controller.

27. The method according to claim 25, wherein said data transfer means comprises a hardware based First In First Out (FIFO) buffer.

28. The method according to claim 25, wherein said data transfer means comprises a Dual Port Random Access Memory (DPRAM).

29. The apparatus according to claim 25, further comprising the step of processing the contents of said memory buffer including said TPC and pilot fields.

30. A Universal Mobile Terrestrial Service (UMTS) User Equipment (UE) compatible communications transceiver, comprising:
analog baseband processor;
a chip rate processor comprising a rake receiver having a plurality of fingers;
a memory adapted to store symbols output of said plurality of fingers;
data transfer means operative to effect the transfer of symbols from said plurality of fingers to said memory;
a processor coupled to said memory; and
software means adapted to be executed on said processor for:
selecting during each time slot a finger having maximal delay as an interrupt timing reference;
configuring said data transfer means during each time slot to generate a first interrupt upon transfer of a first predetermined number of downlink dedicated physical channel (DL-DPCH) pilot symbols determined in accordance with said interrupt timing reference;
configuring said data transfer means during each time slot to generate a second interrupt upon transfer of a second predetermined number of downlink dedicated physical channel (DL-DPCH) Transmit Power Control (TPC) symbols determined in accordance with said interrupt timing reference;

performing symbol rate processing on the contents of said memory.

31. The transceiver according to claim 30, wherein said data transfer means comprises a Direct Memory Access (DMA) controller.

32. The transceiver according to claim 30, wherein said data transfer means comprises a hardware based First In First Out (FIFO) buffer.

33. The transceiver according to claim 30, wherein said data transfer means comprises a Dual Port Random Access Memory (DPRAM).

34. The transceiver according to claim 30, wherein said software means is adapted to process the remainder of said contents of said memory buffer once processing of said TPC and pilot fields is complete.

* * * * *